United States Patent
Bone et al.

(10) Patent No.: US 12,282,141 B2
(45) Date of Patent: Apr. 22, 2025

(54) OPTICAL IMAGING LENS

(71) Applicant: GENIUS ELECTRONIC OPTICAL (XIAMEN) CO., LTD., Fujian (CN)

(72) Inventors: Matthew Bone, Fujian (CN); Yanbin Chen, Fujian (CN); JianPeng Li, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 43 days.

(21) Appl. No.: 17/472,701

(22) Filed: Sep. 13, 2021

(65) Prior Publication Data

US 2022/0137333 A1    May 5, 2022

(30) Foreign Application Priority Data

Nov. 5, 2020   (CN) .......................... 202011223826.6

(51) Int. Cl.
*G02B 13/00*   (2006.01)
*G02B 9/04*    (2006.01)
*G02B 9/06*    (2006.01)

(52) U.S. Cl.
CPC ............. *G02B 13/003* (2013.01); *G02B 9/06* (2013.01)

(58) Field of Classification Search
CPC .... G02B 13/003; G02B 9/06; G02B 13/0015; G02B 13/002
USPC ........................................ 359/717, 793, 794
See application file for complete search history.

(56) References Cited

U.S. PATENT DOCUMENTS

| 6,876,500 | B1* | 4/2005 | Sato .................... G02B 27/0025 359/708 |
| 7,436,604 | B1* | 10/2008 | Tang ........................ G02B 9/10 359/717 |
| 8,400,718 | B2* | 3/2013 | Shigemitsu .......... G02B 13/003 359/717 |
| 2003/0197953 | A1 | 10/2003 | Yamaguchi et al. |
| 2004/0160680 | A1* | 8/2004 | Shinohara .............. G02B 13/18 359/717 |
| 2011/0013290 | A1 | 1/2011 | Shigemitsu et al. |

(Continued)

FOREIGN PATENT DOCUMENTS

| CN | 101604066 | 12/2009 |
| CN | 101937124 | 1/2011 |
| CN | 102033296 | 4/2011 |

(Continued)

OTHER PUBLICATIONS

"Office Action of Taiwan Counterpart Application", issued on Aug. 17, 2022, p. 1-p. 4.

(Continued)

*Primary Examiner* — Marin Pichler
(74) *Attorney, Agent, or Firm* — JCIPRNET

(57) ABSTRACT

An optical imaging lens, including a first lens element and a second lens element arranged in sequence from an object side to an image side along an optical axis. Each of the first lens element and the second lens element includes an object-side surface facing the object side and allowing imaging rays to pass through and an image-side surface facing the image side and allowing the imaging rays to pass through. An optical axis region of the image-side surface of the second lens element is concave, and a periphery region of the image-side surface of the second lens element is convex.

19 Claims, 25 Drawing Sheets

(56) References Cited

U.S. PATENT DOCUMENTS

2011/0205641 A1* 8/2011 Shih .................. G02B 9/06
                                                  359/717
2014/0376112 A1* 12/2014 Tsai ................ G02B 13/003
                                                  359/717

FOREIGN PATENT DOCUMENTS

| CN | 103323934 | 9/2013 |
| CN | 209606697 | 11/2019 |
| TW | M350713 | 2/2009 |
| TW | M465574 | 11/2013 |

OTHER PUBLICATIONS

"Office Action of China Counterpart Application", issued on Jan. 24, 2024, p. 1-p. 8.

* cited by examiner

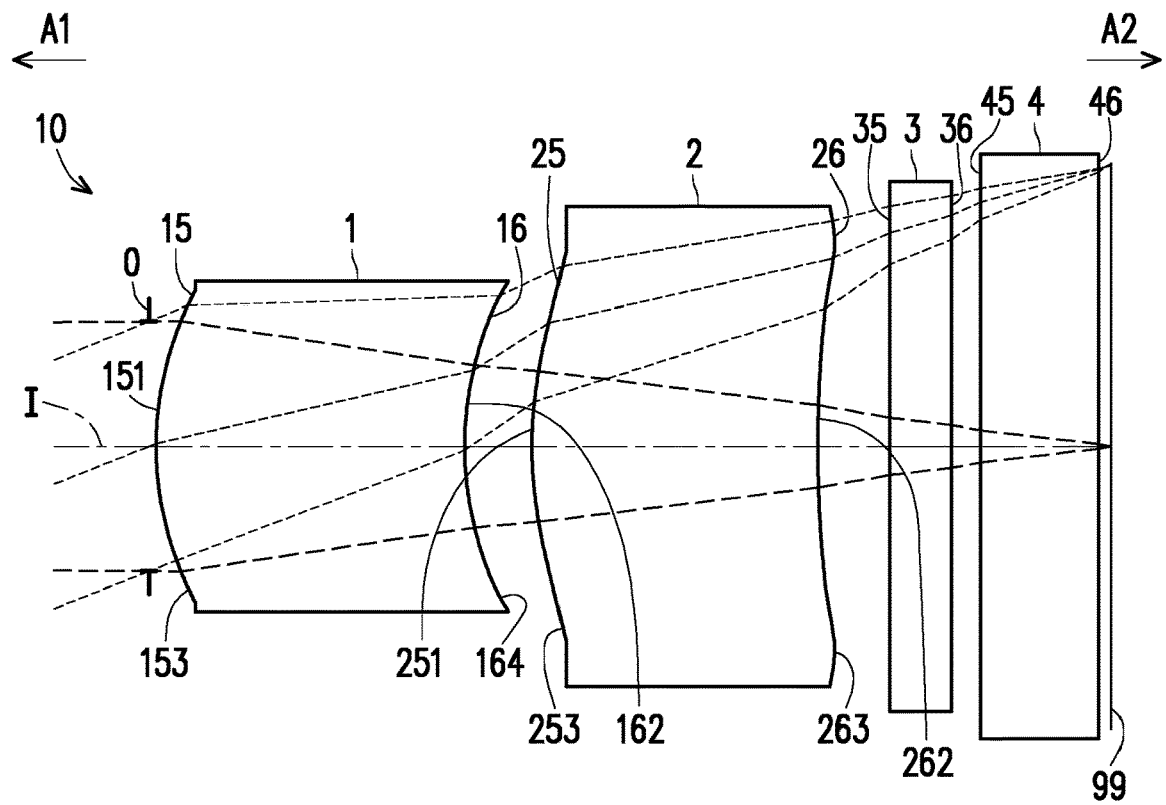
FIG. 6
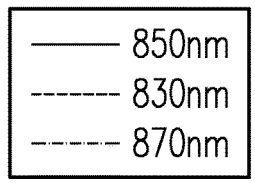
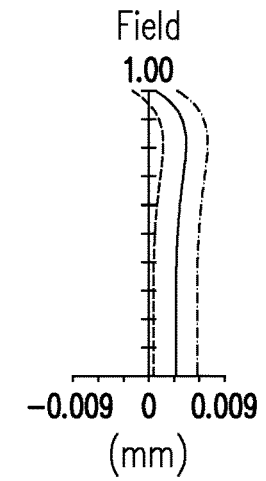
FIG. 7A
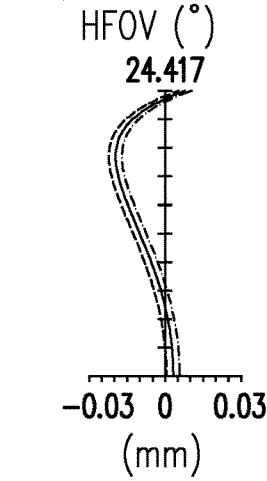
FIG. 7B
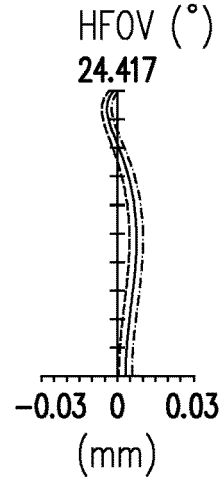
FIG. 7C
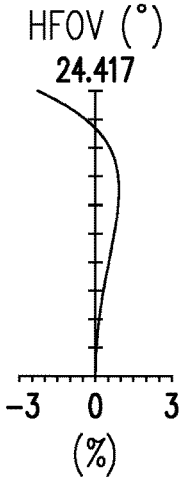
FIG. 7D

| First embodiment |||||||
|---|---|---|---|---|---|---|
| Effective focal length (EFL)= 2.311 mm, half field of view (HFOV)= 24.417°, system length (TTL)= 3.242 mm, F-number (Fno)= 2.718, image height (ImgH)= 0.960 mm. |||||||
| Device | Surface | Radius (mm) | Thickness (mm) | Refractive index | Abbe number | Focal length (mm) |
| Object | | Infinity | Infinity | | | |
| Aperture stop 0 | | Infinity | 0.025 | | | |
| First lens element 1 | Object-side surface 15 | 1.102 | 1.048 | 1.642 | 22.409 | 4.742 |
| | Image-side surface 16 | 1.118 | 0.229 | | | |
| Second lens element 2 | Object-side surface 25 | 1.382 | 0.971 | 1.642 | 22.409 | 2.875 |
| | Image-side surface 26 | 4.438 | 0.243 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.042 | | | |
| | Image plane 99 | Infinity | | | | |

FIG. 8

| Surface | K | a2 | a4 | a6 | a8 |
|---------|---|----|----|----|----|
| 15 | 1.157208E+00 | 0.000000E+00 | -1.425109E-01 | -1.379913E-01 | -2.154114E-01 |
| 16 | 0.000000E+00 | 0.000000E+00 | -1.899168E-01 | 4.143804E-01 | 4.166676E-01 |
| 25 | 0.000000E+00 | 0.000000E+00 | -2.740571E-01 | -2.268171E-02 | 0.000000E+00 |
| 26 | 0.000000E+00 | 0.000000E+00 | 5.535231E-02 | -2.339163E-01 | 5.045212E-02 |

FIG. 9

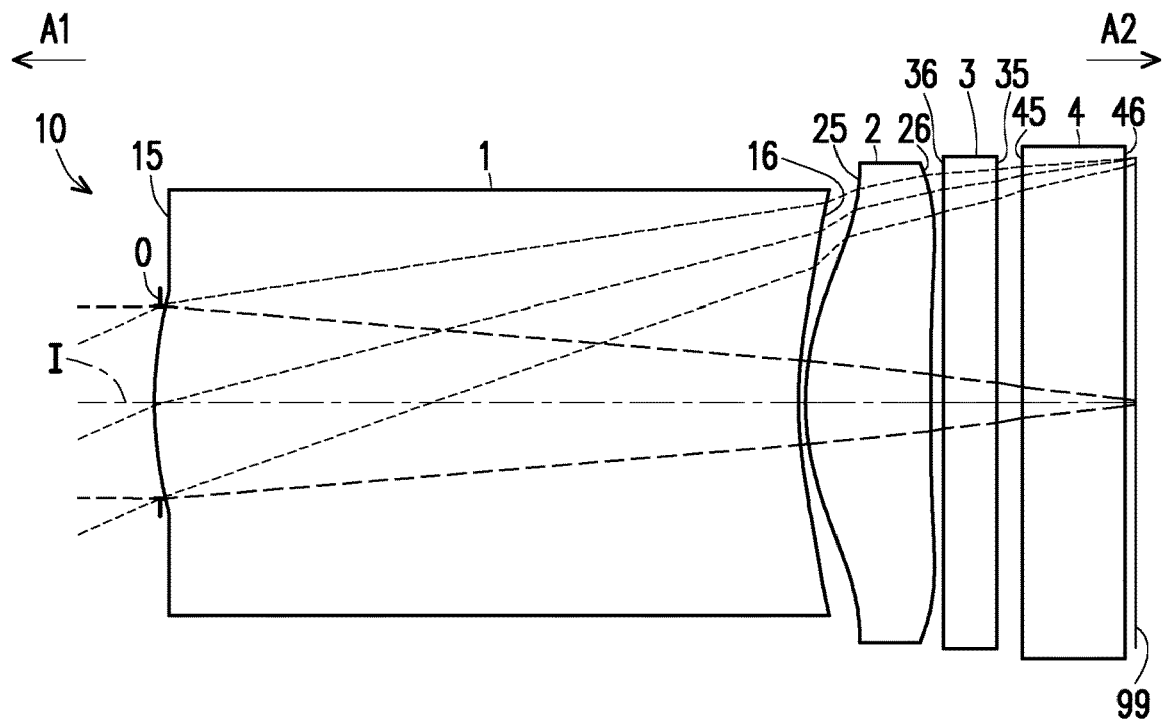
FIG. 10
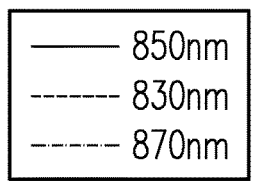
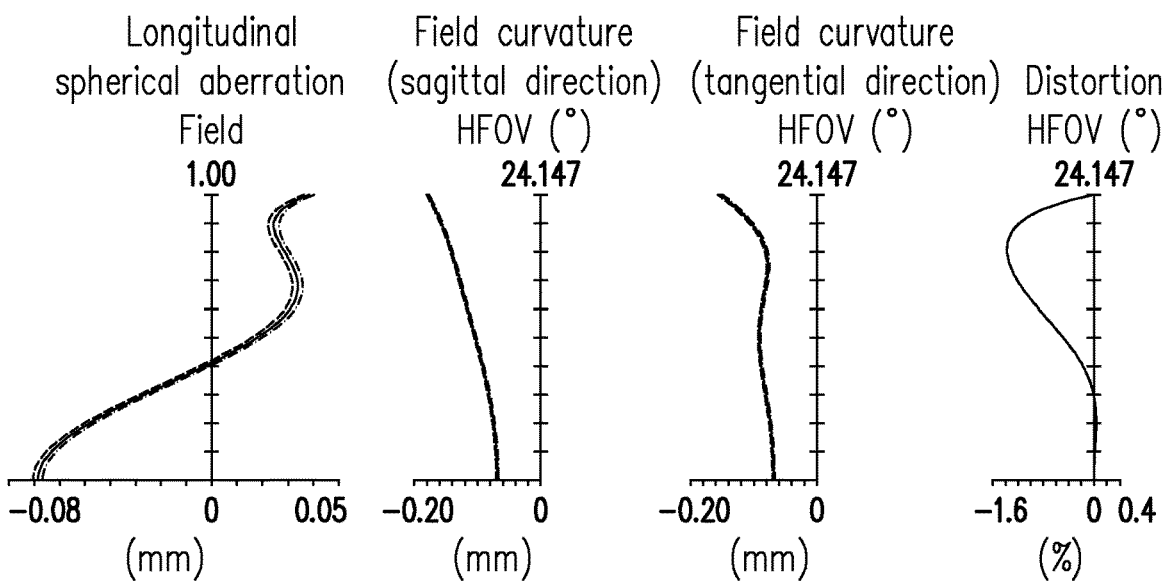
FIG. 11A    FIG. 11B    FIG. 11C    FIG. 11D

| Second embodiment |||||||
|---|---|---|---|---|---|---|
| Effective focal length (EFL)= 2.053 mm, half field of view (HFOV)= 24.147°, system length (TTL)= 3.843 mm, F-number (Fno)= 2.725, image height (ImgH)= 0.960 mm. |||||||
| Device | Surface | Radius (mm) | Thickness (mm) | Refractive index | Abbe number | Focal length (mm) |
| Object | | Infinity | Infinity | | | |
| Aperture stop 0 | | Infinity | -0.023 | | | |
| First lens element 1 | Object-side surface 15 | 1.573 | 2.525 | 1.661 | 20.373 | 3.829 |
| | Image-side surface 16 | 1.651 | 0.027 | | | |
| Second lens element 2 | Object-side surface 25 | 1.039 | 0.490 | 1.661 | 20.373 | 1.627 |
| | Image-side surface 26 | 6529448.139 | 0.050 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.041 | | | |
| | Image plane 99 | Infinity | | | | |

FIG. 12

| Surface | K | $a_2$ | $a_4$ | $a_6$ | $a_8$ |
|---|---|---|---|---|---|
| 15 | 5.41222E+00 | 0.00000E+00 | -5.29949E-01 | 2.48896E+00 | -8.42490E+00 |
| 16 | 0.000000E+00 | 0.000000E+00 | -3.466742E-01 | 1.394363E-01 | 7.155790E-02 |
| 25 | 0.000000E+00 | 0.000000E+00 | -2.711834E-01 | -2.444606E-01 | 0.000000E+00 |
| 26 | 0.000000E+00 | 0.000000E+00 | 3.241965E-01 | -6.970996E-01 | 3.044046E-01 |

FIG. 13

| Third embodiment | | | | | | |
|---|---|---|---|---|---|---|
| Effective focal length (EFL)= 2.451 mm, half field of view (HFOV)= 21.151°, system length (TTL)= 3.850 mm, F-number (Fno)= 2.713, image height (ImgH)= 0.960 mm. | | | | | | |
| Device | Surface | Radius (mm) | Thickness (mm) | Refractive index | Abbe number | Focal length (mm) |
| Object | | Infinity | Infinity | | | |
| Aperture stop 0 | | Infinity | -0.059 | | | |
| First lens element 1 | Object-side surface 15 | 1.326 | 1.217 | 1.661 | 20.373 | 4.625 |
| | Image-side surface 16 | 1.545 | 0.399 | | | |
| Second lens element 2 | Object-side surface 25 | 1.851 | 1.424 | 1.661 | 20.373 | 2.898 |
| | Image-side surface 26 | 367596564.723 | 0.050 | | | |
| First filter 3 | Object-side surface 35 | Infinity | 0.210 | 1.516 | 64.142 | |
| | Image-side surface 36 | Infinity | 0.050 | | | |
| Second filter 4 | Object-side surface 45 | Infinity | 0.400 | 1.516 | 64.142 | |
| | Image-side surface 46 | Infinity | 0.100 | | | |
| | Image plane 99 | Infinity | | | | |

FIG. 16

| Surface | K | $a_2$ | $a_4$ | $a_6$ | $a_8$ |
|---|---|---|---|---|---|
| 15 | 2.14142E+00 | 0.00000E+00 | -1.43626E-01 | 6.79377E-02 | -7.04939E-01 |
| 16 | 0.000000E+00 | 0.000000E+00 | 8.260035E-02 | -1.188816E-01 | 7.144047E-01 |
| 25 | 0.000000E+00 | 0.000000E+00 | -8.939654E-02 | 5.569217E-02 | 0.000000E+00 |
| 26 | 0.000000E+00 | 0.000000E+00 | 6.988311E-02 | -1.616605E-01 | 6.644906E-02 |

FIG. 17

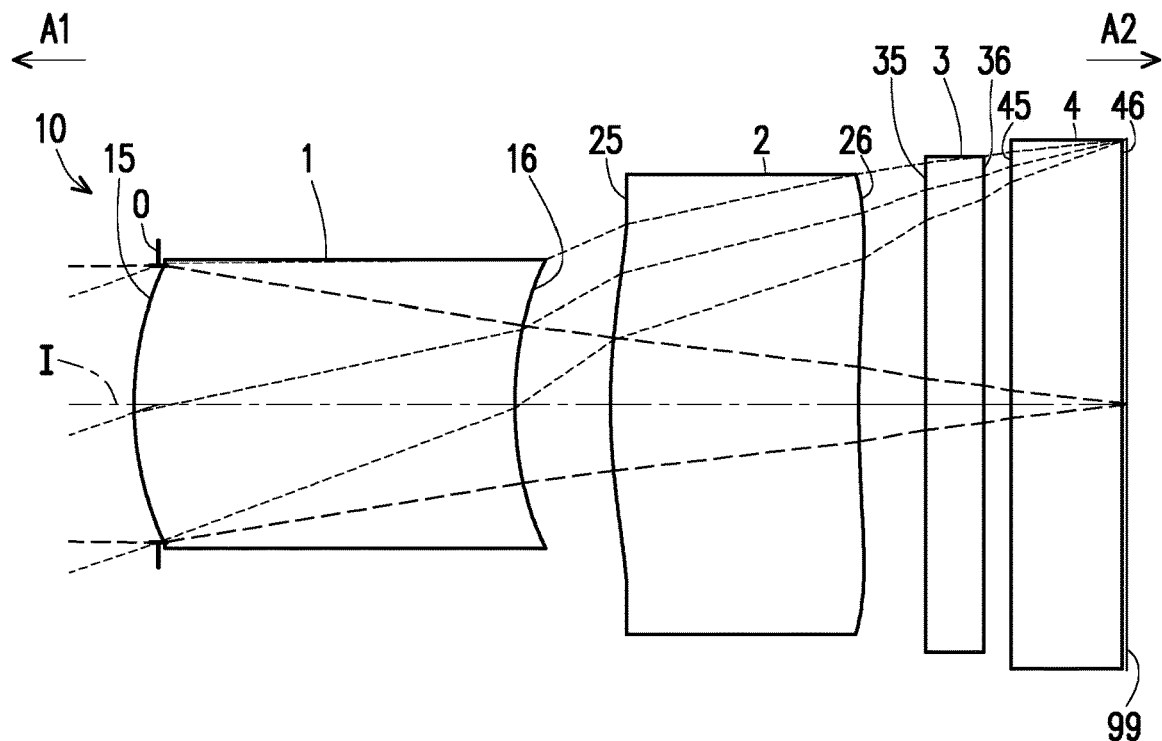
FIG. 18
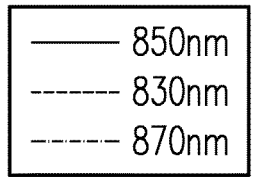
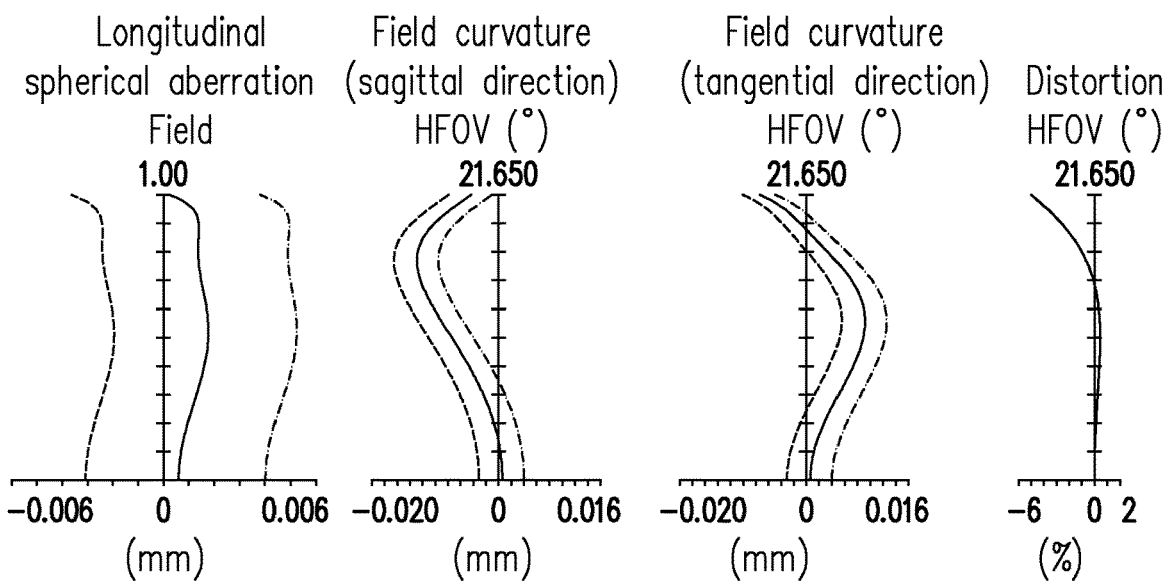
FIG. 19A    FIG. 19B    FIG. 19C    FIG. 19D

| Fourth embodiment ||||||
|---|---|---|---|---|---|
| Effective focal length (EFL)= 2.677 mm, half field of view (HFOV)= 21.650°, system length (TTL)= 3.589 mm, F-number (Fno)= 2.671, image height (ImgH)= 0.960 mm. ||||||
| Device | Surface | Radius (mm) | Thickness (mm) | Refractive index | Abbe number | Focal length (mm) |
| Object | | Infinity | Infinity | | | |
| Aperture stop 0 | | Infinity | -0.088 | | | |
| First lens element 1 | Object-side surface 15 | 1.206 | 1.378 | 1.661 | 20.373 | 3.580 |
| | Image-side surface 16 | 1.415 | 0.344 | | | |
| Second lens element 2 | Object-side surface 25 | 2.384 | 0.898 | 1.661 | 20.373 | 6.037 |
| | Image-side surface 26 | 5.332 | 0.243 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.015 | | | |
| | Image plane 99 | Infinity | | | | |

FIG. 20

| Surface | K | $a_2$ | $a_4$ | $a_6$ | $a_8$ |
|---|---|---|---|---|---|
| 15 | 1.321135E+00 | 0.000000E+00 | -1.090880E-01 | -1.024456E-01 | -1.223211E-01 |
| 16 | 0.000000E+00 | 0.000000E+00 | 8.549657E-02 | 1.165321E-01 | 9.648371E-01 |
| 25 | 0.000000E+00 | 0.000000E+00 | -1.484450E-01 | -1.176690E-01 | 1.616357E-01 |
| 26 | 0.000000E+00 | 0.000000E+00 | -5.620051E-02 | -1.989957E-01 | 9.272524E-02 |
| Surface | $a_{10}$ | | | | |
| 15 | -2.732287E-01 | | | | |
| 16 | -5.778112E-01 | | | | |
| 25 | -1.123634E-01 | | | | |
| 26 | -3.377555E-02 | | | | |

FIG. 21

| Fifth embodiment |||||||
|---|---|---|---|---|---|---|
| Effective focal length (EFL)= 2.799 mm, half field of view (HFOV)= 19.262°, system length (TTL)= 3.475 mm, F-number (Fno)= 2.655, image height (ImgH)= 0.960 mm. |||||||
| Device | Surface | Radius (mm) | Thickness (mm) | Refractive index | Abbe number | Focal length (mm) |
| Object | | Infinity | Infinity | | | |
| Aperture stop 0 | | Infinity | -0.155 | | | |
| First lens element 1 | Object-side surface 15 | 0.968 | 0.878 | 1.661 | 20.373 | 3.701 |
| | Image-side surface 16 | 1.060 | 0.203 | | | |
| Second lens element 2 | Object-side surface 25 | 3.924 | 1.032 | 1.661 | 20.373 | 7.154 |
| | Image-side surface 26 | 24.967 | 0.100 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.552 | | | |
| | Image plane 99 | Infinity | | | | |

FIG. 24

| Surface | K | $a_2$ | $a_4$ | $a_6$ | $a_8$ |
|---|---|---|---|---|---|
| 15 | 4.296841E-01 | 0.000000E+00 | -7.512286E-02 | -2.184577E-02 | -2.682262E-01 |
| 16 | 0.000000E+00 | 0.000000E+00 | 1.799545E-01 | -2.159980E-01 | 2.958330E+00 |
| 25 | 0.000000E+00 | 0.000000E+00 | -1.552542E-01 | -2.162152E-01 | 0.000000E+00 |
| 26 | 0.000000E+00 | 0.000000E+00 | -2.509474E-03 | -1.100778E-01 | 7.384059E-03 |

FIG. 25

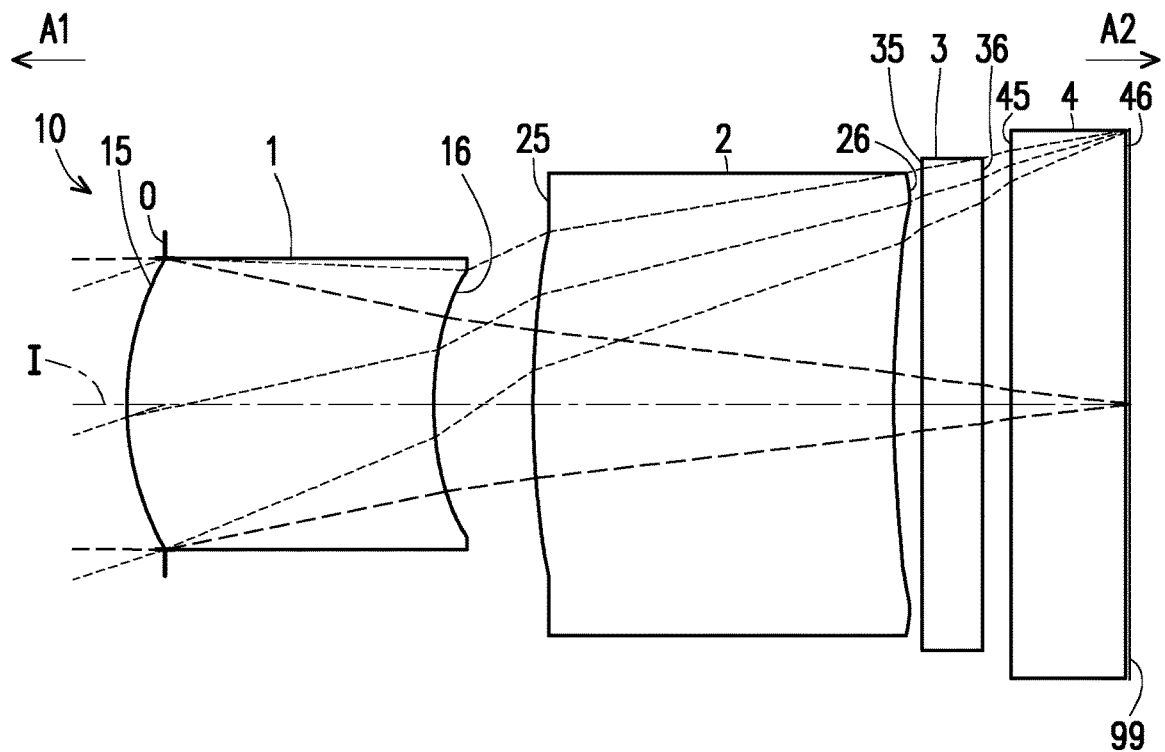
FIG. 26
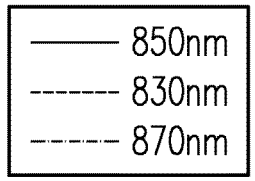
| Longitudinal spherical aberration Field | Field curvature (sagittal direction) HFOV (°) | Field curvature (tangential direction) HFOV (°) | Distortion HFOV (°) |
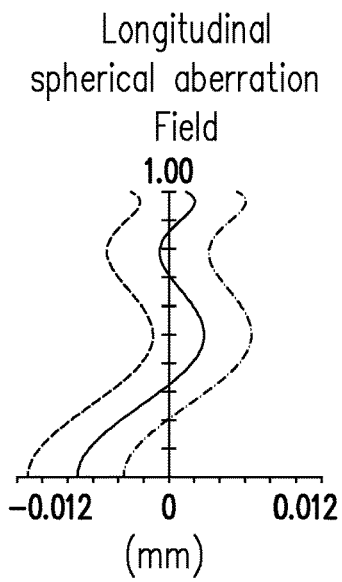
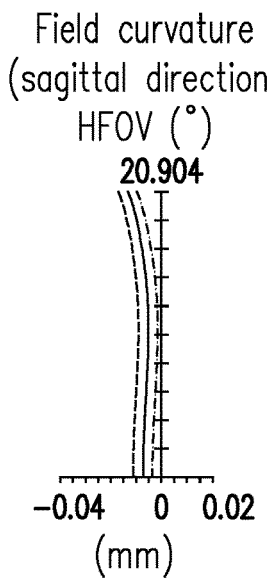
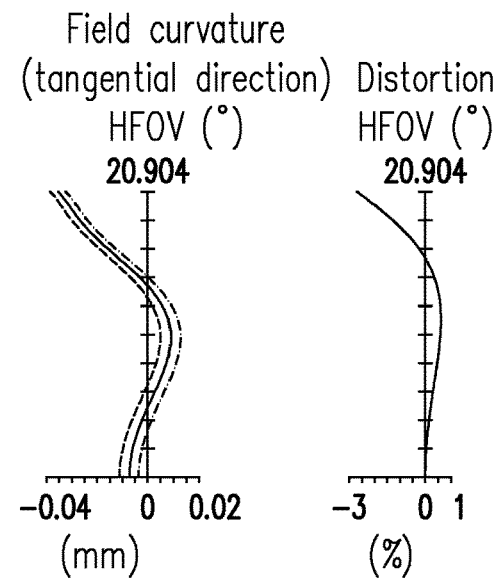
FIG. 27A    FIG. 27B    FIG. 27C    FIG. 27D

| Sixth embodiment |||||||
|---|---|---|---|---|---|---|
| Effective focal length (EFL)= 2.680 mm, half field of view (HFOV)= 20.904°, system length (TTL)= 3.502 mm, F-number (Fno)= 2.634, image height (ImgH)= 0.960 mm. |||||||
| Device | Surface | Radius (mm) | Thickness (mm) | Refractive index | Abbe number | Focal length (mm) |
| Object | | Infinity | Infinity | | | |
| Aperture stop 0 | | Infinity | -0.134 | | | |
| First lens element 1 | Object-side surface 15 | 1.026 | 1.072 | 1.661 | 20.373 | 3.318 |
| | Image-side surface 16 | 1.178 | 0.347 | | | |
| Second lens element 2 | Object-side surface 25 | 3.144 | 1.258 | 1.661 | 20.373 | 13.310 |
| | Image-side surface 26 | 4.211 | 0.100 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.014 | | | |
| | Image plane 99 | Infinity | | | | |

FIG. 28

| Surface | K | $a_2$ | $a_4$ | $a_6$ | $a_8$ |
|---------|---|-------|-------|-------|-------|
| 15 | 8.146601E-01 | 0.000000E+00 | -1.224613E-01 | 2.356370E-02 | -5.763664E-01 |
| 16 | 0.000000E+00 | 0.000000E+00 | 2.093666E-01 | 8.046753E-01 | 1.274217E+00 |
| 25 | 0.000000E+00 | 0.000000E+00 | -1.382780E-01 | 3.189683E-01 | 0.000000E+00 |
| 26 | 0.000000E+00 | 0.000000E+00 | -3.117188E-02 | -1.268716E-01 | 6.651748E-02 |

FIG. 29

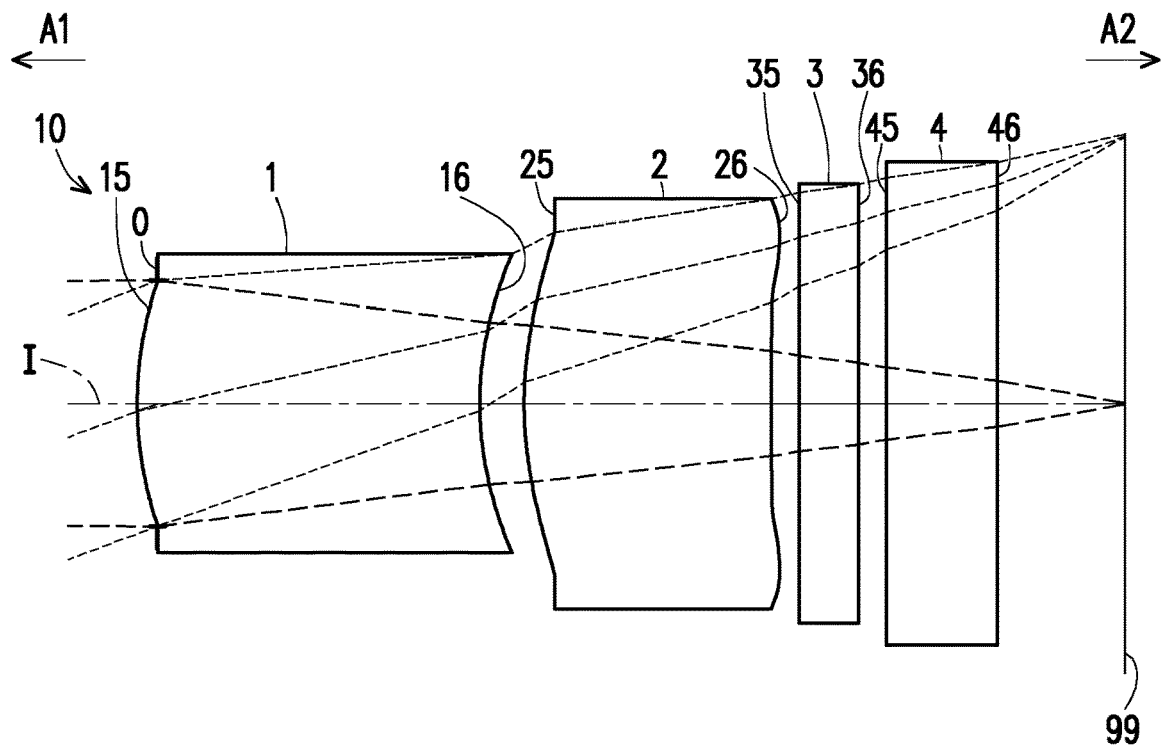
FIG. 30
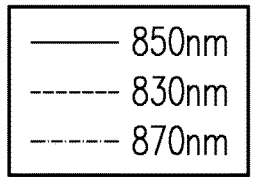
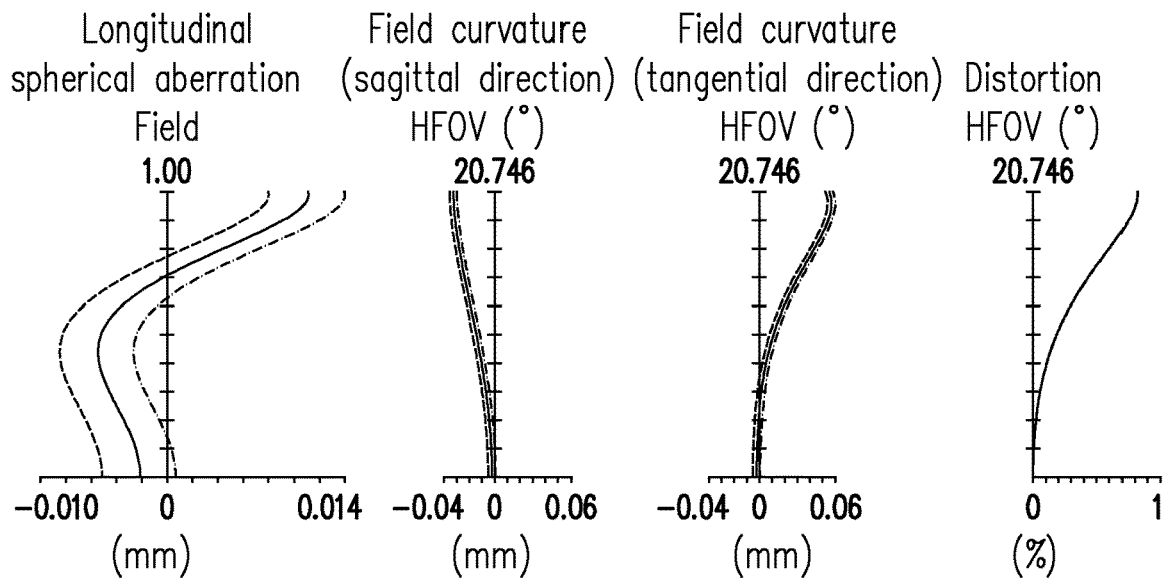
FIG. 31A   FIG. 31B   FIG. 31C   FIG. 31D

| Seventh embodiment |||||||
|---|---|---|---|---|---|---|
| Effective focal length (EFL)= 2.412 mm, half field of view (HFOV)= 20.746°, system length (TTL)= 3.545 mm, F-number (Fno)= 2.731, image height (ImgH)= 0.960 mm. |||||||
| Device | Surface | Radius (mm) | Thickness (mm) | Refractive index | Abbe number | Focal length (mm) |
| Object | | Infinity | Infinity | | | |
| Aperture stop 0 | | Infinity | -0.073 | | | |
| First lens element 1 | Object-side surface 15 | 1.344 | 1.230 | 1.661 | 20.373 | 7.554 |
| | Image-side surface 16 | 1.198 | 0.160 | | | |
| Second lens element 2 | Object-side surface 25 | 1.408 | 0.888 | 1.661 | 20.373 | 2.204 |
| | Image-side surface 26 | 1.073259E+13 | 0.100 | | | |
| First filter 3 | Object-side surface 35 | Infinity | 0.210 | 1.516 | 64.142 | |
| | Image-side surface 36 | Infinity | 0.100 | | | |
| Second filter 4 | Object-side surface 45 | Infinity | 0.400 | 1.516 | 64.142 | |
| | Image-side surface 46 | Infinity | 0.457 | | | |
| | Image plane 99 | Infinity | | | | |

FIG. 32

| Surface | K | $a_2$ | $a_4$ | $a_6$ | $a_8$ |
|---|---|---|---|---|---|
| 15 | 1.380502E+00 | 0.000000E+00 | -7.112212E-02 | -2.116823E-01 | 2.029910E-01 |
| 16 | 0.000000E+00 | 0.000000E+00 | -1.474996E-01 | -1.716863E-01 | 8.523191E-01 |
| 25 | 0.000000E+00 | 0.000000E+00 | -2.244605E-01 | 7.638162E-03 | 0.000000E+00 |
| 26 | 0.000000E+00 | 0.000000E+00 | 2.347351E-02 | 5.171145E-03 | -1.109973E-01 |

FIG. 33

| Conditional expression | First embodiment | Second embodiment | Third embodiment | Fourth embodiment | Fifth embodiment | Sixth embodiment | Seventh embodiment |
|---|---|---|---|---|---|---|---|
| T1 | 1.048 | 2.525 | 1.217 | 1.378 | 0.878 | 1.072 | 1.230 |
| G12 | 0.229 | 0.027 | 0.399 | 0.344 | 0.203 | 0.347 | 0.160 |
| T2 | 0.971 | 0.490 | 1.424 | 0.898 | 1.032 | 1.258 | 0.888 |
| G2F | 0.243 | 0.050 | 0.050 | 0.243 | 0.100 | 0.100 | 0.100 |
| BFL | 0.995 | 0.801 | 0.810 | 0.968 | 1.362 | 0.824 | 1.267 |
| EFL | 2.311 | 2.053 | 2.451 | 2.677 | 2.799 | 2.680 | 2.412 |
| TL | 2.248 | 3.041 | 3.040 | 2.620 | 2.113 | 2.678 | 2.278 |
| TTL | 3.242 | 3.843 | 3.850 | 3.589 | 3.475 | 3.502 | 3.545 |
| ALT | 2.018 | 3.015 | 2.641 | 2.276 | 1.910 | 2.330 | 2.119 |
| HFOV | 24.417 | 24.147 | 21.151 | 21.650 | 19.262 | 20.904 | 20.746 |
| V1 | 22.409 | 20.373 | 20.373 | 20.373 | 20.373 | 20.373 | 20.373 |

FIG. 34

| Conditional expression | First embodiment | Second embodiment | Third embodiment | Fourth embodiment | Fifth embodiment | Sixth embodiment | Seventh embodiment |
|---|---|---|---|---|---|---|---|
| TTL/BFL | 3.259 | 4.795 | 4.752 | 3.706 | 2.552 | 4.250 | 2.798 |
| EFL/(G12+BFL) | 1.888 | 2.479 | 2.027 | 2.039 | 1.788 | 2.288 | 1.691 |
| HFOV/TL | 10.864 | 7.939 | 6.959 | 8.262 | 9.114 | 7.806 | 9.106 |
| T1/T2 | 1.080 | 5.152 | 0.855 | 1.535 | 0.851 | 0.852 | 1.385 |
| ALT/G12 | 8.811 | 112.571 | 6.620 | 6.610 | 9.391 | 6.707 | 13.269 |
| BFL/G12 | 4.342 | 29.924 | 2.031 | 2.812 | 6.696 | 2.371 | 7.935 |
| ALT/BFL | 2.029 | 3.762 | 3.260 | 2.351 | 1.403 | 2.828 | 1.672 |
| (T1+EFL)/BFL | 3.376 | 5.713 | 4.528 | 4.188 | 2.700 | 4.554 | 2.875 |
| HFOV/TTL | 7.531 | 6.284 | 5.494 | 6.033 | 5.543 | 5.969 | 5.852 |
| TL/T1 | 2.145 | 1.205 | 2.497 | 1.901 | 2.407 | 2.498 | 1.852 |
| T2/G12 | 4.237 | 18.298 | 3.569 | 2.608 | 5.074 | 3.622 | 5.563 |
| (G12+BFL)/T2 | 1.261 | 1.690 | 0.849 | 1.462 | 1.517 | 0.931 | 1.606 |
| EFL/BFL | 2.323 | 2.562 | 3.025 | 2.764 | 2.055 | 3.253 | 1.904 |
| TL/BFL | 2.259 | 3.795 | 3.752 | 2.706 | 1.552 | 3.250 | 1.798 |
| HFOV/ALT | 12.097 | 8.010 | 8.010 | 9.512 | 10.085 | 8.970 | 9.793 |
| EFL/T2 | 2.381 | 4.190 | 1.722 | 2.981 | 2.712 | 2.130 | 2.715 |
| T1/G12 | 4.574 | 94.273 | 3.051 | 4.002 | 4.317 | 3.085 | 7.705 |
| EFL/ALT | 1.145 | 0.681 | 0.928 | 1.176 | 1.465 | 1.150 | 1.139 |

FIG. 35

OPTICAL IMAGING LENS

CROSS-REFERENCE TO RELATED APPLICATION

This application claims the priority benefit of China application serial no. 202011223826.6, filed on Nov. 5, 2020. The entirety of the above-mentioned patent application is hereby incorporated by reference herein and made a part of this specification.

BACKGROUND

Technical Field

The disclosure relates to an optical element, and in particular, to an optical imaging lens.

Description of Related Art

In recent years, the optical imaging lenses have evolved to be applied in more widely areas, e.g. in auxiliary photographing device for vehicle. The requirement to reduce cost of the lenses while maintaining good imaging quality, in addition to the requirement for compactness and slimness of the lenses, has always been a challenging problem urged to be solved.

SUMMARY

The disclosure provides an optical imaging lens with small size and compactness, lower cost, and good imaging quality. The optical imaging lens is mainly configured to shoot images and record videos, and be applied in portable electronic device, for instance, mobile phones, cameras, tablet PCs, personal digital assistants (PDAs), auxiliary photographing device for vehicle, and headset, such as virtual reality and/or augmented reality headset and so on.

In an embodiment of the disclosure, an optical imaging lens, including a first lens element and a second lens element arranged in sequence from an object side to an image side along an optical axis. Each of the first lens element and the second lens element includes an object-side surface facing the object side and allowing imaging rays to pass through and an image-side surface facing the image side and allowing the imaging rays to pass through. An optical axis region of the image-side surface of the second lens element is concave, and a periphery region of the image-side surface of the second lens element is convex. Lens elements of the optical imaging lens are only the two lens elements, and the optical imaging lens satisfies: $V1 \leq 30.000$, and $TTL/T2 \leq 8.000$, wherein V1 is an Abbe number of the first lens element, TTL is a distance from the object-side surface of the first lens element to an image plane along the optical axis, and T2 is a thickness of the second lens element along the optical axis.

In an embodiment of the disclosure, an optical imaging lens, including a first lens element and a second lens element arranged in sequence from an object side to an image side along an optical axis. Each of the first lens element and the second lens element includes an object-side surface facing the object side and allowing imaging rays to pass through and an image-side surface facing the image side and allowing the imaging rays to pass through. A periphery region of the image-side surface of the first lens element is concave, and an optical axis region of the image-side surface of the second lens element is concave. Lens elements of the optical imaging lens are only the two lens elements, and the optical imaging lens satisfies: $V1 \leq 30.000$, and $TTL/T2 \leq 4.000$, wherein V1 is an Abbe number of the first lens element, TTL is a distance from the object-side surface of the first lens element to an image plane along the optical axis, and T2 is a thickness of the second lens element along the optical axis.

In an embodiment of the disclosure, an optical imaging lens, including a first lens element and a second lens element arranged in sequence from an object side to an image side along an optical axis. Each of the first lens element and the second lens element includes an object-side surface facing the object side and allowing imaging rays to pass through and an image-side surface facing the image side and allowing the imaging rays to pass through. A periphery region of the image-side surface of the first lens element is concave, and an optical axis region of the object-side surface of the second lens element is convex. Lens elements of the optical imaging lens are only the two lens elements, and the optical imaging lens satisfies: $V1 \leq 30.000$, and $TTL/T2 \leq 4.000$, wherein V1 is an Abbe number of the first lens element, TTL is a distance from the object-side surface of the first lens element to an image plane along the optical axis, and T2 is a thickness of the second lens element along the optical axis.

In view of the above, the optical imaging lens provided in one or more embodiments is advantageous because of the following: the optical imaging lens provided in one or more embodiments satisfies the number of the lens element having refracting power, the surface shape design of the lens elements, and said conditions, so that the optical imaging lens provided herein can have small size, lower cost as well as good imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic diagram illustrating an optical imaging lens according to a first embodiment of the disclosure.

FIG. 7A to FIG. 7D are diagrams illustrating a longitudinal spherical aberration and various aberrations of the optical imaging lens according to the first embodiment.

FIG. 8 shows detailed optical data of the optical imaging lens according to the first embodiment of the disclosure.

FIG. 9 shows aspheric parameters of the optical imaging lens according to the first embodiment of the disclosure.

FIG. 10 is a schematic diagram illustrating an optical imaging lens according to a second embodiment of the disclosure.

FIG. 11A to FIG. 11D are diagrams illustrating a longitudinal spherical aberration and various aberrations of the optical imaging lens according to the second embodiment.

FIG. 12 shows detailed optical data of the optical imaging lens according to the second embodiment of the disclosure.

FIG. 13 shows aspheric parameters of the optical imaging lens according to the second embodiment of the disclosure.

FIG. 16 shows detailed optical data of the optical imaging lens according to the third embodiment of the disclosure.

FIG. 17 shows aspheric parameters of the optical imaging lens according to the third embodiment of the disclosure.

FIG. 18 is a schematic diagram illustrating an optical imaging lens according to a fourth embodiment of the disclosure.

FIG. 19A to FIG. 19D are diagrams illustrating a longitudinal spherical aberration and various aberrations of the optical imaging lens according to the fourth embodiment.

FIG. 20 shows detailed optical data of the optical imaging lens according to the fourth embodiment of the disclosure.

FIG. 21 shows aspheric parameters of the optical imaging lens according to the fourth embodiment of the disclosure.

FIG. 24 shows detailed optical data of the optical imaging lens according to the fifth embodiment of the disclosure.

FIG. 25 shows aspheric parameters of the optical imaging lens according to the fifth embodiment of the disclosure.

FIG. 26 is a schematic diagram illustrating an optical imaging lens according to a sixth embodiment of the disclosure.

FIG. 27A to FIG. 27D are diagrams illustrating a longitudinal spherical aberration and various aberrations of the optical imaging lens according to the sixth embodiment.

FIG. 28 shows detailed optical data of the optical imaging lens according to the sixth embodiment of the disclosure.

FIG. 29 shows aspheric parameters of the optical imaging lens according to the sixth embodiment of the disclosure.

FIG. 30 is a schematic diagram illustrating an optical imaging lens according to a seventh embodiment of the disclosure.

FIG. 31A to FIG. 31D are diagrams illustrating a longitudinal spherical aberration and various aberrations of the optical imaging lens according to the seventh embodiment.

FIG. 32 shows detailed optical data of the optical imaging lens according to the seventh embodiment of the disclosure.

FIG. 33 shows aspheric parameters of the optical imaging lens according to the seventh embodiment of the disclosure.

FIG. 34 and FIG. 35 show values of respective important parameters and relational expressions of the optical imaging lens according to the first to seventh embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
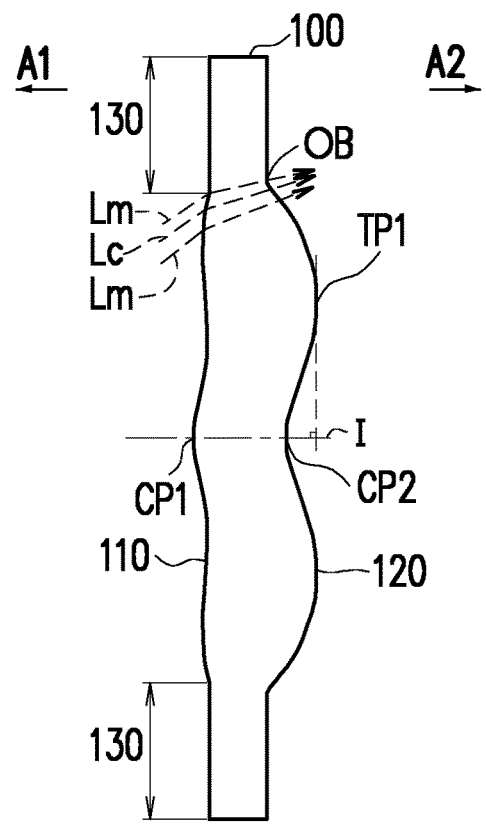
FIG. 1 is a schematic diagram to describe a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
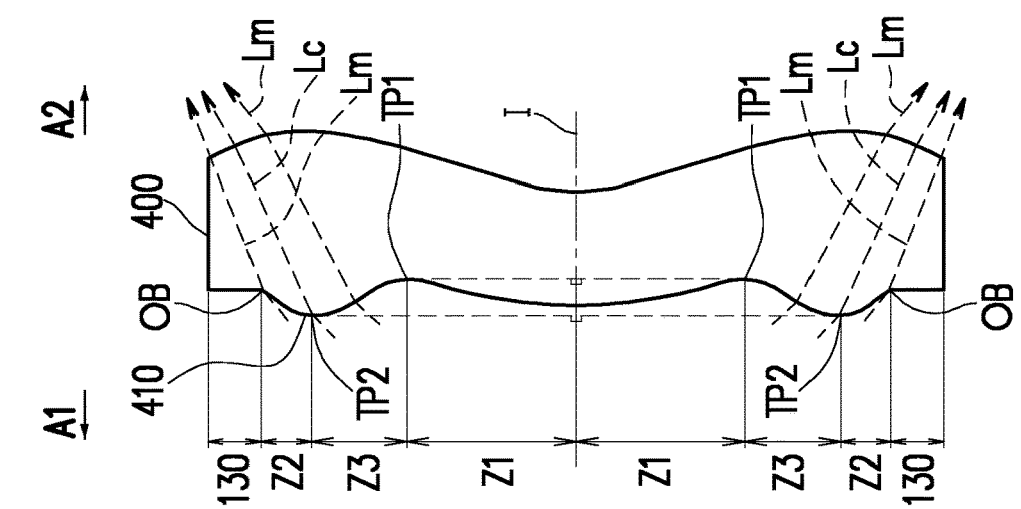
FIG. 4 is a schematic diagram to describe a surface structure of a lens element in an example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
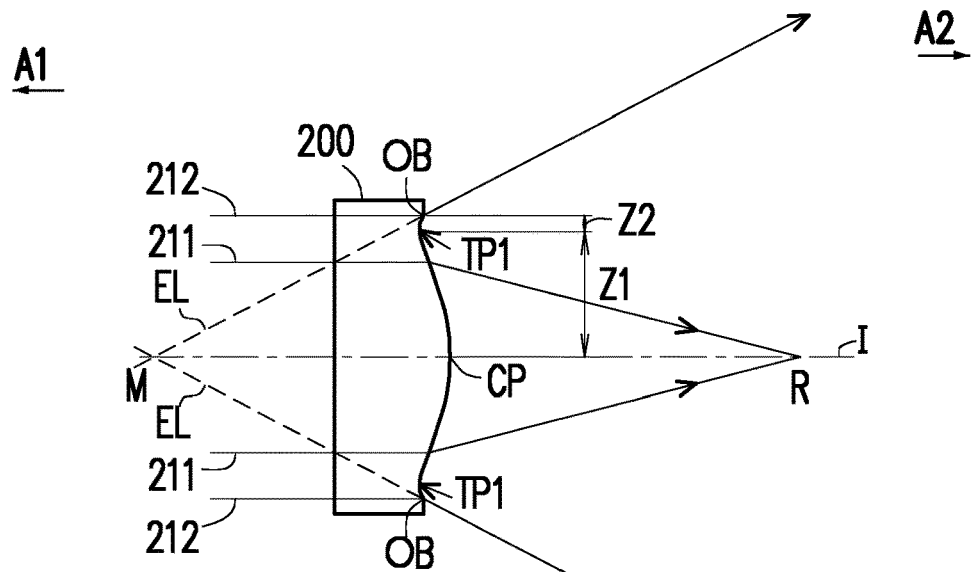
FIG. 2 is a schematic diagram to describe a concave-convex surface structure and a ray focus of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
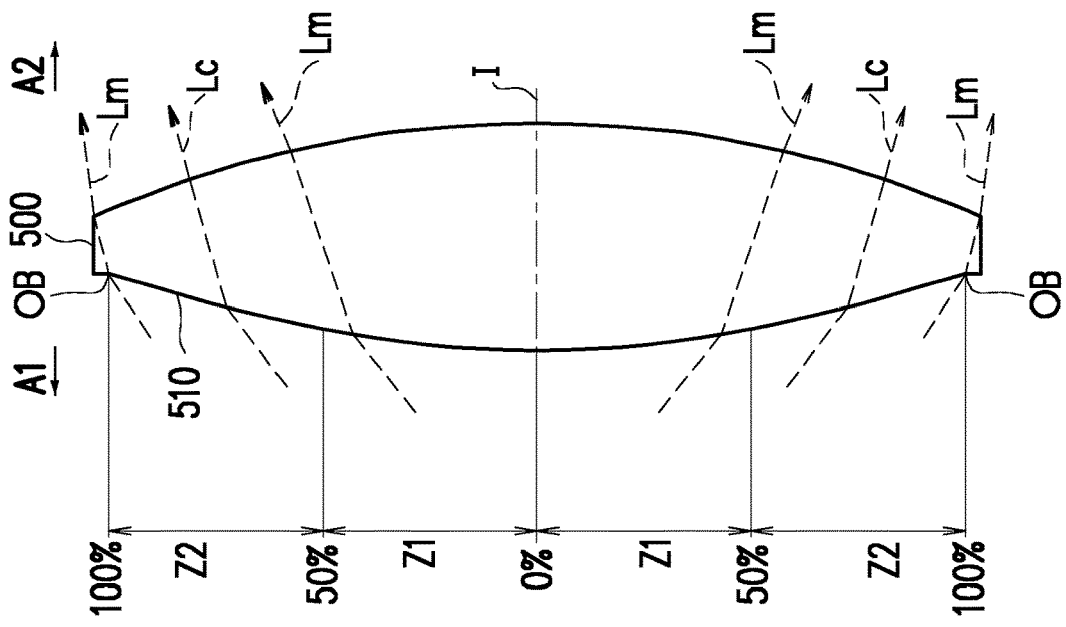
FIG. 5 is a schematic diagram to describe a surface structure of a lens element in an example 3.
Figure 3:
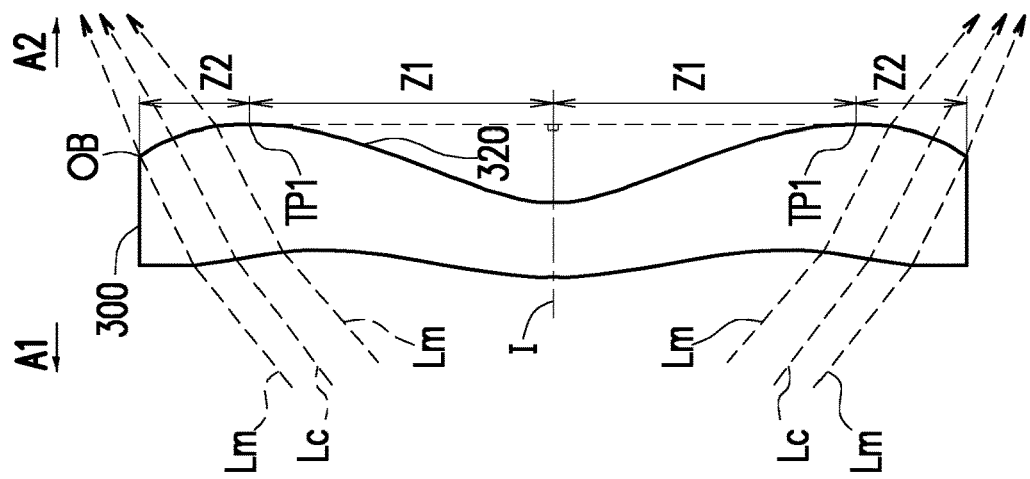
FIG. 3 is a schematic diagram to describe a surface structure of a lens element in an example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the disclosure, and FIG. 7A to FIG. 7D are diagrams illustrating a longitudinal spherical aberration and various aberrations of the optical imaging lens according to the first embodiment. With reference to FIG. 6, the optical imaging lens 10 provided in the first embodiment of the disclosure includes an aperture stop 0, a first lens element 1, a second lens element 2, a first filter 3, and a second filter 4 arranged in sequence from the object side A1 to the image side A2 along an optical axis I of the optical imaging lens 10. When rays emitted from an object to be shot enter the optical imaging lens 10, an image may be formed on an image plane 99 after the rays sequentially pass through the aperture stop 0, the first lens element 1, the second lens element 2, the first filter 3, and the second filter 4. The first filter 3 and the second filter 4 are arranged between the second lens element 2 and the image plane 99. The first filter 3 and the second filter 4 can allow the rays with an appropriate wavelength (e.g., infrared rays or visible rays) to pass through and block the rays with other wavelengths, and may also be a protective glass (cover glass) to protect the optical imaging lens, but is not limit thereto. In addition, the object side A1 is a side facing the object to be shot, whereas the image side A2 is a side facing the image plane 99.

In the present embodiment, the first lens element 1, the second lens element 2, the first filter 3, and the second filter 4 of the optical imaging lens 10 respectively have object-side surfaces 15, 25, 35, and 45 facing the object side A1 and allowing imaging rays to pass through and image-side surfaces 16, 26, 36, and 46 facing the image side A2 and allowing the imaging rays to pass through. In the present embodiment, the aperture stop 0 is arranged on the object side A1 of the first lens element 1.

The first lens element 1 has positive refracting power. The first lens element 1 is made of plastic, but is not limit thereto. The optical axis region 151 of the object-side surface 15 of the first lens element 1 is convex, and the periphery region 153 thereof is convex. The optical axis region 162 of the image-side surface 16 of the first lens element 1 is concave, and the periphery region 164 thereof is concave. In the present embodiment, both the object-side surface 15 and the image-side surface 16 of the first lens element 1 are aspheric surfaces.

The second lens element 2 has positive refracting power. The second lens element 2 is made of plastic, but is not limit thereto. The optical axis region 251 of the object-side surface 25 of the second lens element 2 is convex, and the periphery region 253 thereof is convex. The optical axis region 262 of the image-side surface 26 of the second lens element 2 is concave, and the periphery region 263 thereof is convex. In the present embodiment, both the object-side surface 25 and the image-side surface 26 of the second lens element 2 are aspheric surfaces.

In the present embodiment, the first lens element 1 and the second lens element 2 are only two lens elements of the optical imaging lens 10.

Other detailed optical data provided in the first embodiment are as shown in FIG. 8. In addition, the effective focal length (EFL) of the optical imaging lens 10 provided in the first embodiment is 2.311 mm, the half field of view (HFOV) thereof is 24.417°, the system length (TTL) thereof is 3.242 mm, the f-number (Fno) thereof is 2.718, and the image height (ImgH) thereof is 0.960 mm, wherein the system length is the distance from the object-side surface 15 of the first lens element 1 to the image plane 99 along the optical axis I.

Besides, in the present embodiment, the object-side surfaces 15 and 25 and the image-side surfaces 16 and 26 of the first lens element 1 and the second lens element 2 are all aspheric surfaces defined according to the following formula:

$$Z(Y) = \frac{Y^2}{R} \Bigg/ \left(1 + \sqrt{1-(1+K)\frac{Y^2}{R^2}}\right) + \sum_{i=1}^{n} a_{2i} \times Y^{2i} \quad (1)$$

Y: a distance from a point on an aspheric curve to the optical axis;

Z: a depth of the aspheric surface, i.e., a vertical distance between a point on the aspheric surface that is spaced by the distance Y from the optical axis and a tangent plane tangent to a vertex of the aspheric surface on the optical axis;

R: a radius of curvature of the surface of the lens element;

K: a conic constant; and $a_{2i}$: the $2i^{th}$ order aspheric coefficient.

Respective aspheric coefficients of the object-side surface 15 of the first lens element 1 to the image-side surface 26 of the second lens element 2 in the formula (1) are as shown in FIG. 9. Here, the row number 15 in FIG. 9 represents aspheric coefficients of the object-side surface 15 of the first lens element 1, and other rows are arranged based on the same principle.

Besides, relations of important parameters in the optical imaging lens 10 according to the first embodiment are as shown in FIG. 34 and FIG. 35, and the unit of the respective parameters listed in the rows from T1 to ALT in FIG. 34 is millimeter (mm).

Here,

T1 is a thickness of the first lens element 1 along the optical axis I;

T2 is a thickness of the second lens element 2 along the optical axis I;

G12 is a distance from the image-side surface 16 of the first lens element 1 to the object-side surface 25 of the second lens element 2 along the optical axis I;

ALT is a sum of thicknesses of the first lens element 1 and the second lens element 2 along the optical axis I;

TL is a distance from the object-side surface 15 of the first lens element 1 to the image-side surface 26 of the second lens element 2 along the optical axis I;

TTL is a distance from the object-side surface 15 of the first lens element 1 to the image plane 99 along the optical axis I;

BFL is a distance from the image-side surface 26 of the second lens element 2 to the image plane 99 along the optical axis I;

HFOV is a half field of view of the optical imaging lens 10;

EFL is an effective focal length of the optical imaging lens 10;

ImgH is an image height of the optical imaging lens 10;

Fno is a F-number of the optical imaging lens 10.

f1 is a focal length of the first lens element 1;

f2 is a focal length of the second lens element 2;

n1 is a refractive index of the first lens element 1;

n2 is a refractive index of the second lens element 2;

V1 is an Abbe number of the first lens element 1; and

V2 is an Abbe number of the second lens element 2.

With reference to FIG. 7A to FIG. 7D, the longitudinal spherical aberration provided in the first embodiment is depicted in FIG. 7A, and FIG. 7B and FIG. 7C respectively illustrate the field curvature aberration in the sagittal direction and the field curvature aberration in the tangential direction on the image plane 99 of the first embodiment when the wavelength is 830 nm, 850 nm, and 870 nm, and FIG. 7D illustrates the distortion aberration on the image plane 99 of the first embodiment when the wavelength is 830 nm, 850 nm, and 870 nm. In FIG. 7A illustrating the longitudinal spherical aberration of the first embodiment, the curves representing the respective wavelengths are close to each other and approach the center, indicating that off-axis rays in different heights at the respective wavelengths are focused in a vicinity of the imaging point. Based on extents of deviation of the curves for the respective wavelengths, imaging point deviations of the off-axis rays in different heights are controlled within a range of ±0.009 millimeter (mm). Therefore, the spherical aberration of the same wavelength is reduced in the first embodiment, and the distances among the three representative wavelengths are also close, indicating that imaging positions of rays of different wavelengths are concentrated. Hence, chromatic aberration is also suppressed.

In FIG. 7B and FIG. 7C illustrating the field curvature aberration, the field curvature aberrations of the three representing wavelengths in the whole field range fall within ±0.03 mm, indicating that the optical system provided in the first embodiment is able to effectively reduce aberration. In FIG. 7D illustrating the distortion aberration, the distortion aberration provided in the first embodiment is maintained within a range of ±3%, indicating that the distortion aberration provided in the first embodiment satisfies an imaging quality requirement of the optical system. Hence, compared with the conventional optical imaging lenses, the optical imaging lens provided in the first embodiment is able to render good imaging quality on a condition that the system length is reduced to 3.242 mm. Besides, the difference in the thickness of each lens element in the optical axis region and the periphery region is minor, and therefore the optical imaging lens provided in the first embodiment is, compared to the conventional optical imaging lens, easier to be manufactured and has better yield.

FIG. 10 is a schematic diagram illustrating an optical imaging lens according to a second embodiment of the disclosure, and FIG. 11A to FIG. 11D are diagrams illustrating a longitudinal spherical aberration and various aberrations of the optical imaging lens according to the second embodiment. With reference to FIG. 10, the second embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 10.

Detailed optical data of the optical imaging lens 10 provided in the second embodiment are as shown in FIG. 12. In addition, the effective focal length (EFL) of the optical imaging lens 10 provided in the second embodiment is 2.053 mm, the half field of view (HFOV) thereof is 24.147°, the system length (TTL) thereof is 3.843 mm, the f-number (Fno) thereof is 2.725, and the image height (ImgH) thereof is 0.960 mm.

Respective aspheric coefficients of the object-side surface 15 of the first lens element 1 to the image-side surface 26 of the second lens element 2 of the second embodiment in the formula (1) are as shown in FIG. 13.

Besides, relations of important parameters in the optical imaging lens 10 according to the second embodiment are as shown in FIG. 34 and FIG. 35.

The longitudinal spherical aberration provided in the second embodiment is shown in FIG. 11A, and imaging point deviations of the off-axis rays in different heights are controlled within a range of ±0.08 mm. In FIGS. 11B and 11C illustrating the field curvature aberrations, the field curvature aberrations of the three representative wavelengths in the whole field range fall within ±0.20 mm. The distortion aberration shown in FIG. 11D indicates that the distortion aberration provided in the second embodiment is maintained within a range of ±1.6%. Compared to the conventional optical imaging lens, the second embodiment demonstrates the good imaging quality even though the system length is reduced to 3.843 mm.

In view of the above, the advantages of the second embodiment with respect to the first embodiment are as follows: the distortion aberration provided in the second embodiment is less than that provided in the first embodiment.

Figure 14:
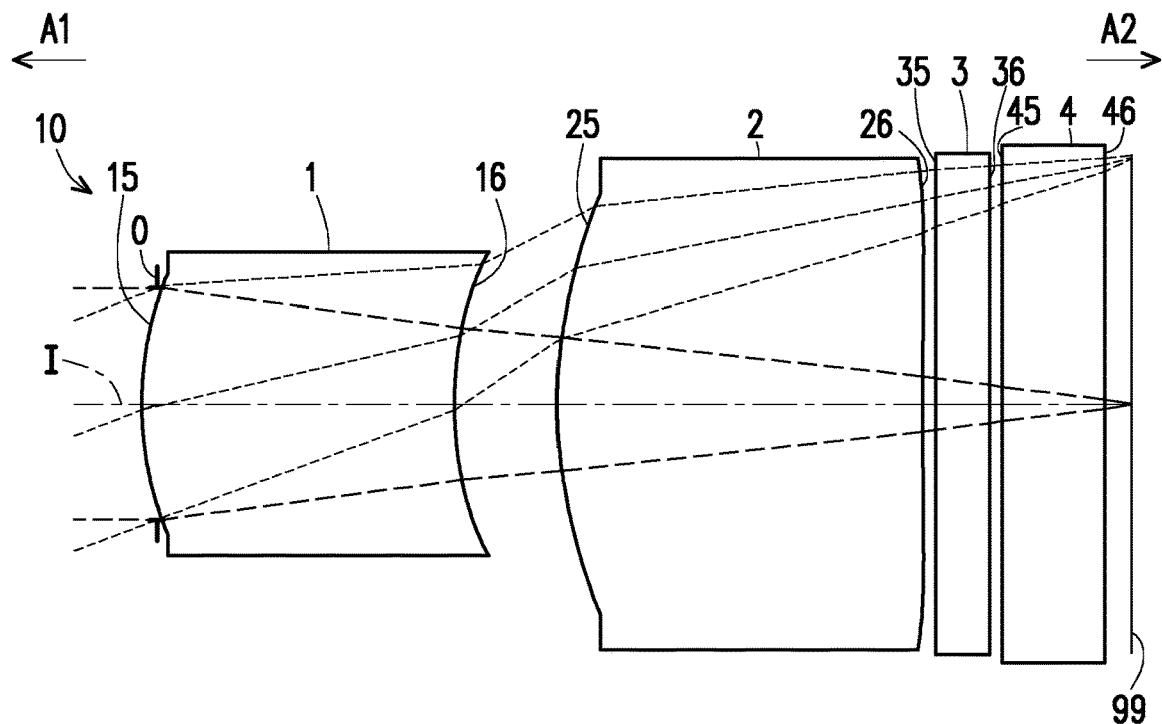
FIG. 14 is a schematic diagram illustrating an optical imaging lens according to a third embodiment of the disclosure.

FIG. 14 is a schematic diagram illustrating an optical imaging lens according to a third embodiment of the disclosure, and FIG. 15A to FIG. 15D are diagrams illustrating a longitudinal spherical aberration and various aberrations of the optical imaging lens according to the third embodiment. With reference to FIG. 14, the third embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 14.

Detailed optical data of the optical imaging lens 10 provided in the third embodiment are as shown in FIG. 16. In addition, the effective focal length (EFL) of the optical imaging lens 10 provided in the third embodiment is 2.451 mm, the half field of view (HFOV) thereof is 21.151°, the system length (TTL) thereof is 3.850 mm, the f-number (Fno) thereof is 2.713, and the image height (ImgH) thereof is 0.960 mm.

Respective aspheric coefficients of the object-side surface 15 of the first lens element 1 to the image-side surface 26 of the second lens element 2 of the third embodiment in the formula (1) are as shown in FIG. 17.

Besides, relations of important parameters in the optical imaging lens 10 according to the third embodiment are as shown in FIG. 34 and FIG. 35.

Figures 15A, 15B, 15C, 15D:
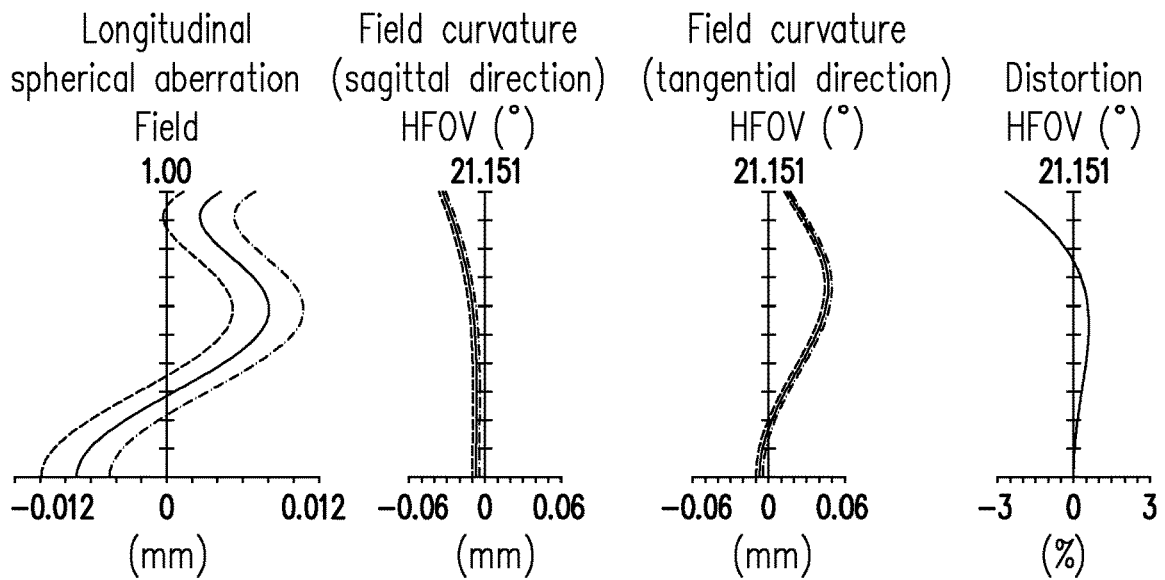
FIG. 15A to FIG. 15D are diagrams illustrating a longitudinal spherical aberration and various aberrations of the optical imaging lens according to the third embodiment.

The longitudinal spherical aberration provided in the third embodiment is shown in FIG. 15A, and imaging point deviations of the off-axis rays in different heights are controlled within a range of ±0.012 mm. In FIGS. 15B and 15C illustrating the field curvature aberrations, the field curvature aberrations of the three representative wavelengths in the whole field range fall within ±0.06 mm. The distortion aberration shown in FIG. 15D indicates that the distortion aberration provided in the third embodiment is maintained within a range of ±3%. Compared to the conventional optical imaging lens, the optical imaging lens provided in the third embodiment demonstrates the good imaging quality even though the system length is reduced to 3.850 mm.

FIG. 18 is a schematic diagram illustrating an optical imaging lens according to a fourth embodiment of the disclosure, and FIG. 19A to FIG. 19D are diagrams illustrating a longitudinal spherical aberration and various aberrations of the optical imaging lens according to the fourth embodiment. With reference to FIG. 18, the fourth embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 18.

Detailed optical data of the optical imaging lens 10 provided in the fourth embodiment are as shown in FIG. 20. In addition, the effective focal length (EFL) of the optical imaging lens 10 provided in the fourth embodiment is 2.677 mm, the half field of view (HFOV) thereof is 21.650°, the system length (TTL) thereof is 3.589 mm, the f-number (Fno) thereof is 2.671, and the image height (ImgH) thereof is 0.960 mm.

Respective aspheric coefficients of the object-side surface 15 of the first lens element 1 to the image-side surface 26 of the second lens element 2 of the fourth embodiment in the formula (1) are as shown in FIG. 21.

Besides, relations of important parameters in the optical imaging lens 10 according to the fourth embodiment are as shown in FIG. 34 and FIG. 35.

The longitudinal spherical aberration provided in the fourth embodiment is shown in FIG. 19A, and imaging point deviations of the off-axis rays in different heights are controlled within a range of ±0.006 mm. In FIGS. 19B and 19C illustrating the field curvature aberrations, the field curvature aberrations of the three representative wavelengths in the whole field range fall within ±0.020 mm. The distortion aberration shown in FIG. 19D indicates that the distortion aberration provided in the fourth embodiment is maintained within a range of ±6%. Compared to the conventional optical imaging lens, the fourth embodiment demonstrates the good imaging quality even though the system length is reduced to 3.589 mm.

In view of the above, the advantages of the fourth embodiment with respect to the first embodiment are as follows: the spherical aberration and the field curvature aberrations provided in the fourth embodiment is less than that provided in the first embodiment. Besides, the difference in the thickness of each lens element in the optical axis region and the periphery region is minor, and therefore the optical imaging lens provided in the fourth embodiment is, compared to that provided in the first embodiment, easier to be manufactured and has better yield.

Figure 22:
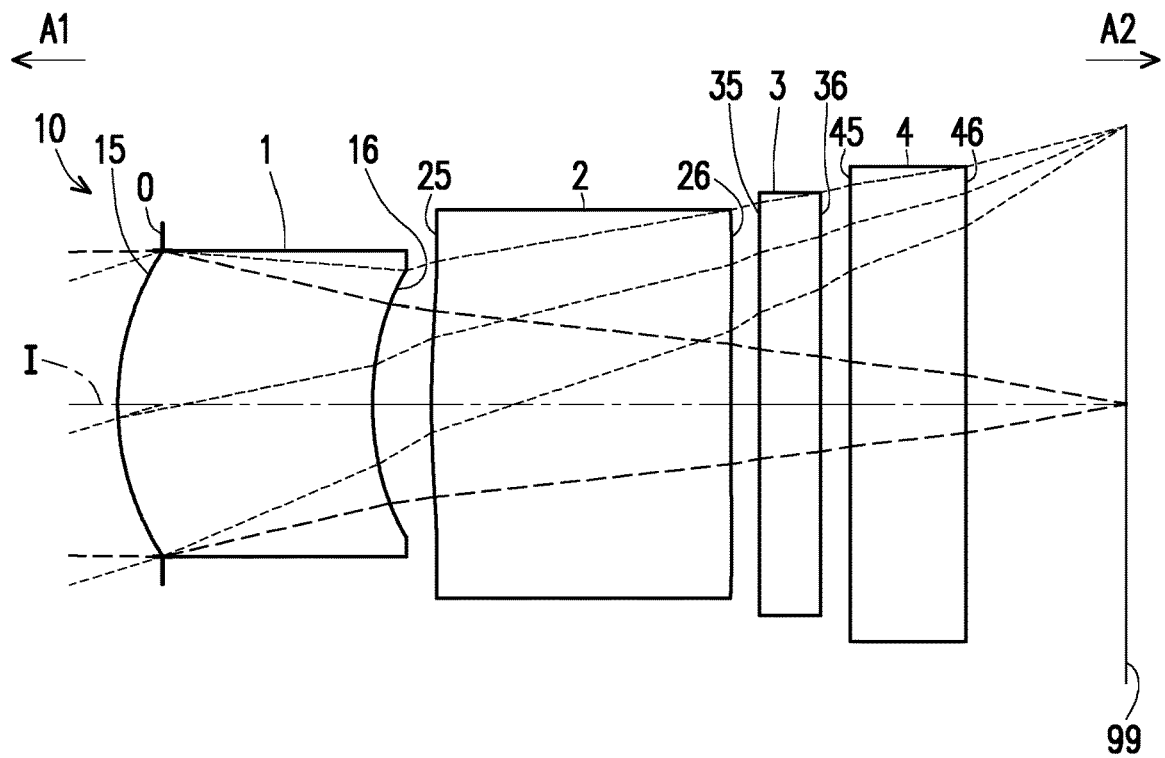
FIG. 22 is a schematic diagram illustrating an optical imaging lens according to a fifth embodiment of the disclosure.

FIG. 22 is a schematic diagram illustrating an optical imaging lens according to a fifth embodiment of the disclosure, and FIG. 23A to FIG. 23D are diagrams illustrating a longitudinal spherical aberration and various aberrations of the optical imaging lens according to the fifth embodiment. With reference to FIG. 22, the fifth embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 22.

Detailed optical data of the optical imaging lens 10 provided in the fifth embodiment are as shown in FIG. 24. In addition, the effective focal length (EFL) of the optical imaging lens 10 provided in the fifth embodiment is 2.799 mm, the half field of view (HFOV) thereof is 19.262°, the system length (TTL) thereof is 3.475 mm, the f-number (Fno) thereof is 2.655, and the image height (ImgH) thereof is 0.960 mm.

Respective aspheric coefficients of the object-side surface 15 of the first lens element 1 to the image-side surface 26 of the second lens element 2 of the fifth embodiment in the formula (1) are as shown in FIG. 25.

Besides, relations of important parameters in the optical imaging lens 10 according to the fifth embodiment are as shown in FIG. 34 and FIG. 35.

Figures 23A, 23B, 23C, 23D:
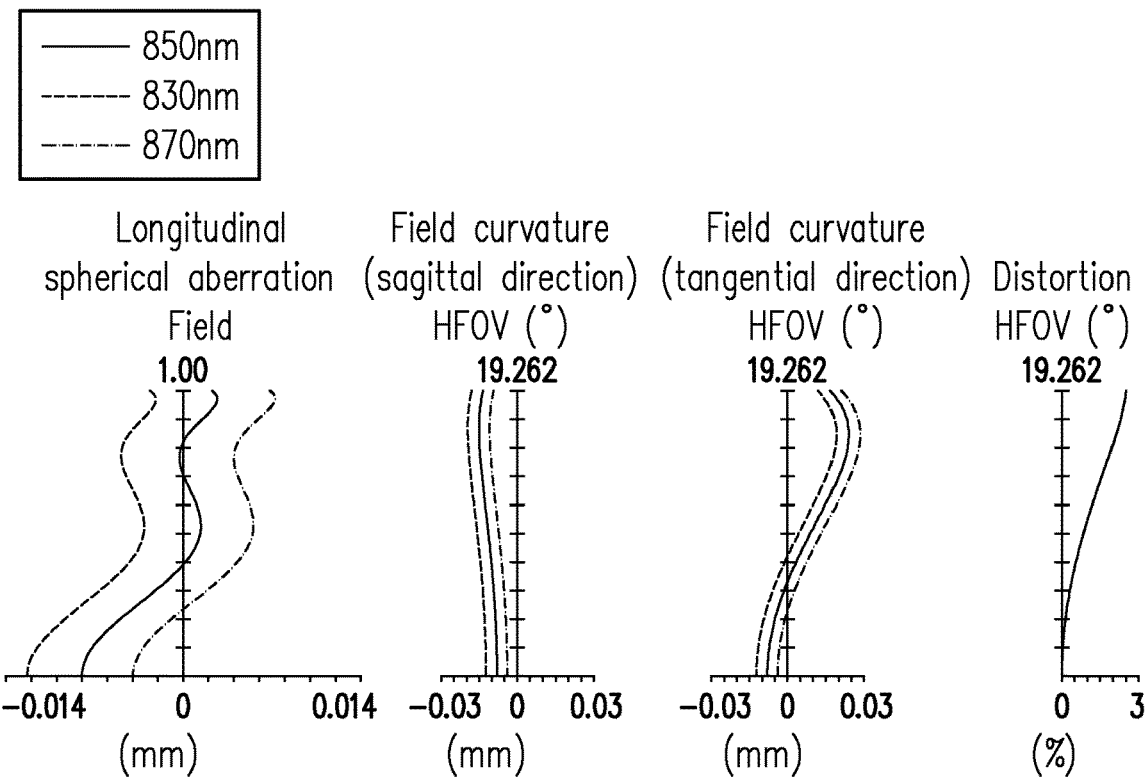
FIG. 23A to FIG. 23D are diagrams illustrating a longitudinal spherical aberration and various aberrations of the optical imaging lens according to the fifth embodiment.

The longitudinal spherical aberration provided in the fifth embodiment is shown in FIG. 23A, and imaging point deviations of the off-axis rays in different heights are controlled within a range of ±0.014 mm. In FIGS. 23B and 23C illustrating the field curvature aberrations, the field curvature aberrations of the three representative wavelengths in the whole field range fall within ±0.03 mm. The distortion aberration shown in FIG. 23D indicates that the distortion aberration provided in the fifth embodiment is maintained within a range of ±3%. Compared to the conventional optical imaging lens, the fifth embodiment demonstrates the good imaging quality even though the system length is reduced to 3.475 mm.

In view of the above, the advantages of the fifth embodiment with respect to the first embodiment are as follows: the difference in the thickness of each lens element in the optical axis region and the periphery region is minor, and therefore the optical imaging lens provided in the fifth embodiment is, compared to that provided in the first embodiment, easier to be manufactured and has better yield.

FIG. 26 is a schematic diagram illustrating an optical imaging lens according to a sixth embodiment of the disclosure, and FIG. 27A to FIG. 27D are diagrams illustrating a longitudinal spherical aberration and various aberrations of the optical imaging lens according to the sixth embodiment. With reference to FIG. 26, the sixth embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 26.

Detailed optical data of the optical imaging lens 10 provided in the sixth embodiment are as shown in FIG. 28. In addition, the effective focal length (EFL) of the optical imaging lens 10 provided in the sixth embodiment is 2.680 mm, the half field of view (HFOV) thereof is 20.904°, the system length (TTL) thereof is 3.502 mm, the f-number (Fno) thereof is 2.634, and the image height (ImgH) thereof is 0.960 mm.

Respective aspheric coefficients of the object-side surface 15 of the first lens element 1 to the image-side surface 26 of the second lens element 2 of the sixth embodiment in the formula (1) are as shown in FIG. 29.

Besides, relations of important parameters in the optical imaging lens 10 according to the sixth embodiment are as shown in FIG. 34 and FIG. 35.

The longitudinal spherical aberration provided in the sixth embodiment is shown in FIG. 27A, and imaging point deviations of the off-axis rays in different heights are controlled within a range of ±0.012 mm. In FIGS. 27B and 27C illustrating the field curvature aberrations, the focal length variation of the three representative wavelengths in the whole field range falls within ±0.04 mm. The distortion aberration shown in FIG. 27D indicates that the distortion aberration provided in the sixth embodiment is maintained within a range of ±3%. Compared to the conventional optical imaging lens, the sixth embodiment demonstrates the good imaging quality even though the system length is reduced to 3.502 mm.

In view of the above, the advantages of the sixth embodiment with respect to the first embodiment are as follows: the difference in the thickness of each lens element in the optical axis region and the periphery region is minor, and therefore the optical imaging lens provided in the sixth embodiment is, compared to that provided in the first embodiment, easier to be manufactured and has better yield.

FIG. 30 is a schematic diagram illustrating an optical imaging lens according to a seventh embodiment of the disclosure, and FIG. 31A to FIG. 31D are diagrams illustrating a longitudinal spherical aberration and various aberrations of the optical imaging lens according to the seventh embodiment. With reference to FIG. 30, the seventh embodiment describing the optical imaging lens 10 is similar to the first embodiment, while the difference therebetween lies in the optical data, the aspheric coefficients, and the parameters of the lens elements 1 and 2. To clearly illustrate the drawing, some reference numerals indicating the optical axis regions and the periphery regions similar to those in the first embodiment are omitted in FIG. 30.

Detailed optical data of the optical imaging lens 10 provided in the seventh embodiment are as shown in FIG. 32. In addition, the effective focal length (EFL) of the optical imaging lens 10 provided in the seventh embodiment is 2.412 mm, the half field of view (HFOV) thereof is 20.746°, the system length (TTL) thereof is 3.545 mm, the f-number (Fno) thereof is 2.731, and the image height (ImgH) thereof is 0.960 mm.

Respective aspheric coefficients of the object-side surface 15 of the first lens element 1 to the image-side surface 26 of the second lens element 2 of the seventh embodiment in the formula (1) are as shown in FIG. 33.

Besides, relations of important parameters in the optical imaging lens 10 according to the seventh embodiment are as shown in FIG. 34 and FIG. 35.

The longitudinal spherical aberration provided in the seventh embodiment is shown in FIG. 31A, and imaging point deviations of the off-axis rays in different heights are controlled within a range of ±0.014 mm. In FIGS. 31B and 31C illustrating the field curvature aberrations, the focal length variation of the three representative wavelengths in the whole field range falls within ±0.06 mm. The distortion aberration shown in FIG. 31D indicates that the distortion aberration provided in the seventh embodiment is maintained within a range of ±1%. Compared to the conventional optical imaging lens, the seventh embodiment demonstrates the good imaging quality even though the system length is reduced to 3.545 mm.

In view of the above, the advantages of the seventh embodiment with respect to the first embodiment are as follows: the distortion aberration provided in the seventh embodiment is less than that provided in the first embodiment. Besides, the difference in the thickness of each lens element in the optical axis region and the periphery region is minor, and therefore the optical imaging lens provided in the seventh embodiment is, compared to that provided in the first embodiment, easier to be manufactured and has better yield.

FIG. 34 to FIG. 35 are tables showing respective optical parameters according to the first to seventh embodiments of the disclosure.

Through controlling the following parameters, designers are able to design the technical feasible optical imaging lens with good optical performance, lower cost, and reduced effective length:

1. When the optical axis region of the image-side surface of the second lens element is concave, the periphery region of the image-side surface of the second lens element is convex, and the optical imaging lens satisfies $V1 \leq 30.000$ and $TTL/T2 \leq 8.000$, the aberrations of the optical imaging lens may be improved, and the distortion aberration and the chromatic aberrations are also reduced. The numerical values of $TTL/T2$ is preferably satisfying $2.500 \leq TTL/T2 \leq 8.000$, and the numerical values of $V1$ is preferably satisfying $20.000 \leq V1 \leq 30.000$.

2. When the periphery region of the image-side surface of the first lens element is concave, and the optical imaging lens satisfies $V1 \leq 30.000$ and $TTL/T2 \leq 4.000$, and satisfies one of the following: the optical axis region of the image-side surface of the second lens element being concave, and the optical axis region of the object-side surface of the second lens element being convex, the aberrations of the optical imaging lens may be improved and the distortion aberration is also reduced. Also, satisfying $TTL/T2 \leq 4.000$ may further reduce the system length of the optical imaging lens. The numerical values of $TTL/T2$ is preferably satisfying $2.500 \leq TTL/T2 \leq 4.000$, and the numerical values of $V1$ is preferably satisfying $20.000 \leq V1 \leq 30.000$.

3. The lens elements provided herein are made of plastic, which ensures that the weight of the lens can be further reduced, and that the manufacturing costs can be reduced.

4. To shorten the system length of the optical imaging lens while ensuring the imaging quality, and in consideration of the difficulty of manufacturing, the thicknesses of the lens elements and the air gaps between the lens elements are properly reduced in one or more embodiments of the disclosure, or different half field of view with corresponding thicknesses of the lenses may be designed. The optical imaging lens 10 can be better configurated if at least one of the following conditions is satisfied:

$TTL/BFL \geq 2.500$, preferably $2.500 \leq TTL/BFL \leq 5.300$;
   $EFL/(G12+BFL) \geq 1.400$, preferably $1.400 \leq EFL/(G12+BFL) \leq 2.700$;
   $HFOV/TL \geq 6.000$ degrees/mm, preferably $6.000$ degrees/mm$\leq HFOV/TL \leq 11.500$ degrees/mm;
   $T1/T2 \geq 0.850$, preferably $0.850 \leq T1/T2 \leq 5.700$;
   $ALT/G12 \geq 6.600$, preferably $6.600 \leq ALT/G12 \leq 120.000$;
   $BFL/G12 \geq 2.000$, preferably $2.000 \leq BFL/G12 \leq 33.000$;
   $ALT/BFL \geq 1.400$, preferably $1.400 \leq ALT/BFL \leq 4.100$;
   $(T1+EFL)/BFL \geq 2.700$, preferably $2.700 \leq (T1+EFL)/BFL \leq 6.300$;
   $HFOV/TTL \geq 5.000$ degrees/mm, preferably $5.000$ degrees/mm$\leq HFOV/TTL \leq 8.000$ degrees/mm;
   $TL/T1 \leq 3.300$, preferably $1.100 \leq TL/T1 \leq 3.300$;
   $T2/G12 \geq 2.600$, preferably $2.600 \leq T2/G12 \leq 20.000$;
   $(G12+BFL)/T2 \leq 1.700$, preferably $0.800 \leq (G12+BFL)/T2 \leq 1.700$;
   $EFL/BFL \geq 1.700$, preferably $1.700 \leq EFL/BFL \leq 3.600$;
   $TL/BFL \geq 1.500$, preferably $1.500 \leq TL/BFL \leq 4.200$;
   $HFOV/ALT \geq 8.000$ degrees/mm, preferably $8.000$ degrees/mm$\leq HFOV/ALT \leq 12.500$ degrees/mm;
   $EFL/T2 \leq 4.200$, preferably $1.500 \leq EFL/T2 \leq 4.200$;
   $T1/G12 \geq 2.700$, preferably $2.700 \leq T1/G12 \leq 100.000$; and/or
   $EFL/ALT \leq 2.700$, preferably $0.600 \leq EFL/ALT \leq 2.700$.

Besides, for the design of the lens having configuration similar to that of the embodiments of the disclosure, limitations choosing from an arbitrary combination/relation of the parameters of the embodiments may be added on the lens.

Considering the unpredictability in the design of optical system, under the configuration of the embodiments provided herein, the optical imaging lens 10 provided in one or more embodiments of the disclosure may have a shorter system length, good imaging quality, or better assembling yield rate and overcome drawbacks of the conventional optical imaging lenses if the above conditions are satisfied. The range including maximum and minimum numeral values derived from the combinations/ratios of the optical parameters disclosed in the embodiments of the disclosure may all be applicable and enable people skilled in the pertinent art to carry out.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element and a second lens element arranged in sequence from an object side to an image side along an optical axis, wherein each of the first lens element and the second lens element comprises an object-side surface facing the object side and allowing imaging rays to pass through and an image-side surface facing the image side and allowing the imaging rays to pass through;
    wherein an optical axis region of the image-side surface of the second lens element is concave, and a periphery region of the image-side surface of the second lens element is convex;
    wherein lens elements of the optical imaging lens are only the two lens elements, and the optical imaging lens satisfies:
    $V1 \leq 30.000$, $TTL/T2 \leq 8.000$, $ALT/BFL \geq 1.400$, and $T1/G12 \geq 2.700$, wherein V1 is an Abbe number of the first lens element, TTL is a distance from the object-side surface of the first lens element to an image plane along the optical axis, T2 is a thickness of the second lens element along the optical axis, ALT is a sum of thicknesses of the first lens element and the second lens element along the optical axis, BFL is a distance from the image-side surface of the second lens element to the image plane along the optical axis, and T1 is a thickness of the first lens element along the optical axis, and G12 is a distance from the image-side surface of the first lens element to the object-side surface of the second lens element along the optical axis,
    wherein when a surface of a lens element has at least one transition point, an optical axis region of the surface of the lens element is defined as a region from a central point thereof to a first transition point thereof, a periphery region thereof is defined as a region located radially outside of a farthest Nth transition point from the optical axis to an optical boundary of the surface of the lens element, the central point of the surface of the lens element is a point of intersection of that surface and the optical axis, the transition point thereof is a point on the surface of the lens element, at which the line tangent to that point is perpendicular to the optical axis, where N is greater than zero, the optical boundary of the surface of the lens element is defined as a point at which a radially outermost marginal ray passing through the surface of the lens element intersects the surface of the lens element, and wherein when the surface of the lens element has no transition point, that is, N is equal to zero, the periphery region of the surface of the lens element is defined as a region between 50% and 100% of a distance between the optical axis and the optical boundary of the surface of the lens element.

2. The optical imaging lens according to claim 1, wherein the optical imaging lens further satisfies the following conditional expression: $TTL/BFL \geq 2.500$.

3. The optical imaging lens according to claim 1, wherein the optical imaging lens further satisfies the following conditional expression: $EFL/(G12+BFL) \geq 1.400$, wherein EFL is an effective focal length of the optical imaging lens.

4. The optical imaging lens according to claim 1, wherein the optical imaging lens further satisfies the following conditional expression: $HFOV/TL \geq 6.000$ degrees/mm, wherein HFOV is a half field of view of the optical imaging lens, and TL is a distance from the object-side surface of the first lens element to the image-side surface of the second lens element along the optical axis.

5. The optical imaging lens according to claim 1, wherein the optical imaging lens further satisfies the following conditional expression: $T1/T2 \geq 0.850$.

6. The optical imaging lens according to claim 1, wherein the optical imaging lens further satisfies the following conditional expression: $ALT/G12 \geq 6.600$.

7. The optical imaging lens according to claim 1, wherein the optical imaging lens further satisfies the following conditional expression: $BFL/G12 \geq 2.000$.

8. An optical imaging lens, comprising a first lens element and a second lens element arranged in sequence from an object side to an image side along an optical axis, wherein each of the first lens element and the second lens element comprises an object-side surface facing the object side and allowing imaging rays to pass through and an image-side surface facing the image side and allowing the imaging rays to pass through;
    wherein a periphery region of the image-side surface of the first lens element is concave, and an optical axis region of the image-side surface of the second lens element is concave;
    wherein lens elements of the optical imaging lens are only the two lens elements, and the optical imaging lens satisfies:
    $V1 \leq 30.000$, $TTL/T2 \leq 4.000$, and $T1/G12 \geq 2.700$, wherein V1 is an Abbe number of the first lens element, TTL is a distance from the object-side surface of the first lens element to an image plane along the optical axis, T2 is a thickness of the second lens element along the optical axis, and T1 is a thickness of the first lens element along the optical axis, and G12 is a distance from the image-side surface of the first lens element to the object-side surface of the second lens element along the optical axis.

9. The optical imaging lens according to claim 8, wherein the optical imaging lens further satisfies the following conditional expression: $ALT/BFL \geq 1.400$, wherein ALT is a sum of thicknesses of the first lens element and the second lens element along the optical axis, and BFL is a distance from the image-side surface of the second lens element to the image plane along the optical axis.

10. The optical imaging lens according to claim 8, wherein the optical imaging lens further satisfies the following conditional expression: $(T1+EFL)/BFL \geq 2.700$, wherein EFL is an effective focal length of the optical imaging lens, and BFL is a distance from the image-side surface of the second lens element to the image plane along the optical axis.

11. The optical imaging lens according to claim 8, wherein the optical imaging lens further satisfies the following conditional expression: HFOV/TTL≥5.000 degrees/mm, wherein HFOV is a half field of view of the optical imaging lens.

12. The optical imaging lens according to claim 8, wherein the optical imaging lens further satisfies the following conditional expression: TL/T1≤3.300, wherein TL is a distance from the object-side surface of the first lens element to the image-side surface of the second lens element along the optical axis.

13. The optical imaging lens according to claim 8, wherein the optical imaging lens further satisfies the following conditional expression: T2/G12≥2.600.

14. The optical imaging lens according to claim 8, wherein the optical imaging lens further satisfies the following conditional expression: (G12+BFL)/T2≤1.700, wherein BFL is a distance from the image-side surface of the second lens element to the image plane along the optical axis.

15. An optical imaging lens, comprising a first lens element and a second lens element arranged in sequence from an object side to an image side along an optical axis, wherein each of the first lens element and the second lens element comprises an object-side surface facing the object side and allowing imaging rays to pass through and an image-side surface facing the image side and allowing the imaging rays to pass through;
   wherein a periphery region of the image-side surface of the first lens element is concave, and an optical axis region of the object-side surface of the second lens element is convex;
   wherein a radius of curvature of the object-side surface of the second lens element is greater than a radius of curvature of the image-side surface of the first lens element;
   wherein lens elements of the optical imaging lens are only the two lens elements, and the optical imaging lens satisfies:
   V1≤30.000, TTL/T2≤4.000, and T1/G12≥2.700, wherein V1 is an Abbe number of the first lens element, TTL is a distance from the object-side surface of the first lens element to an image plane along the optical axis, T2 is a thickness of the second lens element along the optical axis, and T1 is a thickness of the first lens element along the optical axis, and G12 is a distance from the image-side surface of the first lens element to the object-side surface of the second lens element along the optical axis.

16. The optical imaging lens according to claim 15, wherein the optical imaging lens further satisfies the following conditional expression: EFL/BFL≥1.700, wherein EFL is an effective focal length of the optical imaging lens, and BFL is a distance from the image-side surface of the second lens element to the image plane along the optical axis.

17. The optical imaging lens according to claim 15, wherein the optical imaging lens further satisfies the following conditional expression: TL/BFL≥1.500, wherein TL is a distance from the object-side surface of the first lens element to the image-side surface of the second lens element along the optical axis, and BFL is a distance from the image-side surface of the second lens element to the image plane along the optical axis.

18. The optical imaging lens according to claim 15, wherein the optical imaging lens further satisfies the following conditional expression: HFOV/ALT≥8.000 degrees/mm, wherein HFOV is a half field of view of the optical imaging lens, and ALT is a sum of thicknesses of the first lens element and the second lens element along the optical axis.

19. The optical imaging lens according to claim 15, wherein the optical imaging lens further satisfies the following conditional expression: EFL/T2≤4.200, wherein EFL is an effective focal length of the optical imaging lens.

* * * * *